United States Patent
Olsson et al.

(10) Patent No.: US 9,243,602 B2
(45) Date of Patent: Jan. 26, 2016

(54) IGNITION SYSTEM CONTROL METHOD AND SYSTEM

(75) Inventors: Johan Olsson, Åmål (SE); Tim Olsson, Åmål (SE)

(73) Assignee: SEM AKTIEBOLAG, Amal (SE)

(*) Notice: Subject to any disclaimer, the term of this patent is extended or adjusted under 35 U.S.C. 154(b) by 906 days.

(21) Appl. No.: 13/503,731

(22) PCT Filed: Nov. 8, 2010

(86) PCT No.: PCT/SE2010/051216
§ 371 (c)(1),
(2), (4) Date: Jun. 20, 2012

(87) PCT Pub. No.: WO2011/056141
PCT Pub. Date: May 12, 2011

(65) Prior Publication Data
US 2012/0255530 A1 Oct. 11, 2012

(30) Foreign Application Priority Data

Nov. 6, 2009 (SE) ...................... 0950836

(51) Int. Cl.
*F02P 3/04* (2006.01)
*H04B 15/02* (2006.01)
(Continued)

(52) U.S. Cl.
CPC ............ *F02P 3/0414* (2013.01); *F02P 1/086* (2013.01); *F02P 3/096* (2013.01); *F02P 17/12* (2013.01); *H04B 15/02* (2013.01); *F02P 2017/003* (2013.01)

(58) Field of Classification Search
CPC ........ H04B 15/025; F02P 17/12; F02P 1/086; F02P 1/0884; F02P 1/0892; F02P 3/0861; F02P 3/0869; F02P 3/09; F02P 3/093; F02P 3/096

USPC ........ 123/599, 600, 601, 604, 616, 617, 630, 123/633; 73/114.62
See application file for complete search history.

(56) References Cited

U.S. PATENT DOCUMENTS 3,955,549 A 5/1976 Burson
4,155,341 A * 5/1979 Fernquist et al. ........ 123/406.57
(Continued)

FOREIGN PATENT DOCUMENTS

DE 10107070 A1 4/2002
JP A-H04-265446 9/1992
(Continued)

OTHER PUBLICATIONS

Japanese Office Action issued in Japanese Application No. 2012-536759, Jul. 29, 2014, pp. 1-12.
(Continued)

*Primary Examiner* — Erick Solis
(74) *Attorney, Agent, or Firm* — Jeffrey S. Melcher; Manelli Selter PLLC

(57) ABSTRACT

The present invention relates to a method for monitoring an ignition system, wherein the ignition system comprises a charge coil (L1) for charging the ignition system, a primary coil (L4) and a secondary coil (L5), said primary and secondary coils (L4, L5) being arranged to generate a voltage for spark generation, and a control unit (M1), characterized in the steps a) providing a separate coil (L3) adjacent to at least one of the charge coil (L1), the primary coil (L4) and the secondary coil (L5) b) using the control unit (M1) to monitor a magnetic flux at the separate coil (L3), and c) using information regarding said magnetic flux as input for controlling at least one property of an operation of the ignition system. The invention also relates to a control system for an ignition system.

14 Claims, 4 Drawing Sheets

(51) Int. Cl.
*F02P 1/08* (2006.01)
*F02P 3/09* (2006.01)
*F02P 17/12* (2006.01)
*F02P 17/00* (2006.01)

(56) References Cited

U.S. PATENT DOCUMENTS

| | | | | |
|---|---|---|---|---|
| 4,852,540 | A | * | 8/1989 | Safranek ........................ 123/599 |
| 4,901,704 | A | | 2/1990 | Safranek |
| 5,050,553 | A | | 9/1991 | Erhard |
| 5,551,397 | A | * | 9/1996 | Early ........................ 123/406.13 |
| 6,009,865 | A | | 1/2000 | Herndon et al. |
| 6,805,109 | B2 | * | 10/2004 | Cowan ........................... 123/604 |
| 7,111,618 | B1 | * | 9/2006 | Walker .......................... 123/599 |
| 7,121,270 | B1 | | 10/2006 | Plotnikov |

| | | | |
|---|---|---|---|
| 2002/0078937 | A1 | 6/2002 | Kiessling |
| 2007/0181110 | A1 | 8/2007 | Toriyama et al. |
| 2008/0178841 | A1 | 7/2008 | Andersson et al. |

FOREIGN PATENT DOCUMENTS

| | | |
|---|---|---|
| JP | A-2000-120517 | 4/2000 |
| JP | A-2008-208829 | 9/2008 |
| WO | 2009099388 | 8/2009 |

OTHER PUBLICATIONS

Office Action issued in Russian Chinese patent application No. 201080060699.0, Jan. 20, 2015, pp. 1-3.
Chinese Office Action issued in Chines Application No. 2014041700916760, Apr. 22, 2014, pp. 1-9.
Office Action issued in Russian Federation, Oct. 23, 2014, pp. 1-3.

* cited by examiner

IGNITION SYSTEM CONTROL METHOD AND SYSTEM

TECHNICAL FIELD

The present invention relates to a method for monitoring an ignition system, wherein the ignition system comprises a charge coil and a control unit. The invention also relates to a control system for an ignition system.

BACKGROUND ART

Within the field of ignition systems, a high and reliable performance is generally required in order to supply ignition to a combustion engine in a cost and energy efficient manner. A problem, however, lies in gathering information regarding the performance of the system, since any attempt at measuring properties such as the magnetic flux at the charge coil or trig coil of a conventional system will suffer from disturbances due to the spark generation, among other things. In the event that the charge coil is periodically short-circuited in order to enhance the charging of a charge capacitor, such as is shown by SE0600752-0, for instance, this process also generates a high level of disturbances in the magnetic flux in the ignition system. It is therefore difficult to gather enough information to successfully monitor and control the ignition system, and as a result sparks can be generated at an unsuitable position or direction, such as during high compression in the engine, for instance. Also, external systems involving sensors or the like that expect to detect a spark from the ignition system will suffer from these disturbances, resulting in a decreased performance or even damages to the systems. For ignition systems that use a double pole bridge flywheel, the problems can be especially serious, since the risk for generating a spark at the wrong time based on incorrect information is increased, compared to systems using a single pole bridge flywheel.

There is therefore clearly a need for an ignition control system that can monitor and control the performance of the ignition system and eliminate the risk of undesirable spark generation without interference from the normal ignition system functions.

DISCLOSURE OF THE INVENTION

The object of the present invention is to eliminate or at least to minimise the problems described above. This is achieved through a method according to the preamble of claim 1, wherein the method comprises the steps of providing a separate coil adjacent to at least one of the charge coil, primary coil or secondary coil, using the control unit to monitor a magnetic flux at the separate coil, and using information regarding said magnetic flux as input for controlling at least one property of an operation of the ignition system. Thereby, the performance of these coils in creating or altering a magnetic flux can be monitored in a reliable manner, while decreasing the risk of measuring disturbances that can be created at a coil during some stages of operation of the ignition system.

Thanks to the measurements of the magnetic flux at the separate coil, the generation of a current at the charge coil can be monitored, as well as the process of generating a spark at the primary and secondary coil. Since the measurement takes place on a separate coil not taking part in the charging and spark creation, the disadvantages otherwise associated with performing measurements on either of these coils or on a trig coil, namely the generation of disturbances on the magnetic field at or around an iron core used with any or all of these coils, can be avoided and the reliability of the gathered data significantly increased. It is especially beneficial to detect a direction of rotation of a flywheel through the analysis of the magnetic flux.

According to an aspect of the invention, the ignition system further comprises a trig coil and the method comprises the step of using information regarding a magnetic flux at the trig coil together with the information of the magnetic flux at the separate coil as input for controlling at least one property of an operation of the ignition system. Thereby, the performance of these coils in creating or altering a magnetic flux can be monitored in a reliable manner through comparison of the magnetic flux at the separate coil and the trig coil, while decreasing the risk of measuring disturbances that can be created at a coil during some stages of operation of the ignition system.

It is especially beneficial to use a separate coil for measurements during stages where the performance of the ignition system must be closely monitored, such as when the system is used with slower speeds (i.e. lower rpm speed of a flywheel) or when the engine with which the ignition system is used bounces due to high compression. If a spark is given at a wrong ignition timing or when the flywheel is rotating in the wrong direction there is a high risk that the engine will backfire with hardware damages or even personal injuries as a consequence.

Thanks to the invention, the speed and position of a flywheel with one or more magnets can be determined, and the risk for giving off a spark at an undesirable time can be substantially lowered.

BRIEF DESCRIPTION OF THE DRAWINGS

The invention will now be described in more detail with reference to the appended drawing, wherein.

DETAILED DESCRIPTION OF THE INVENTION

Figure 1:
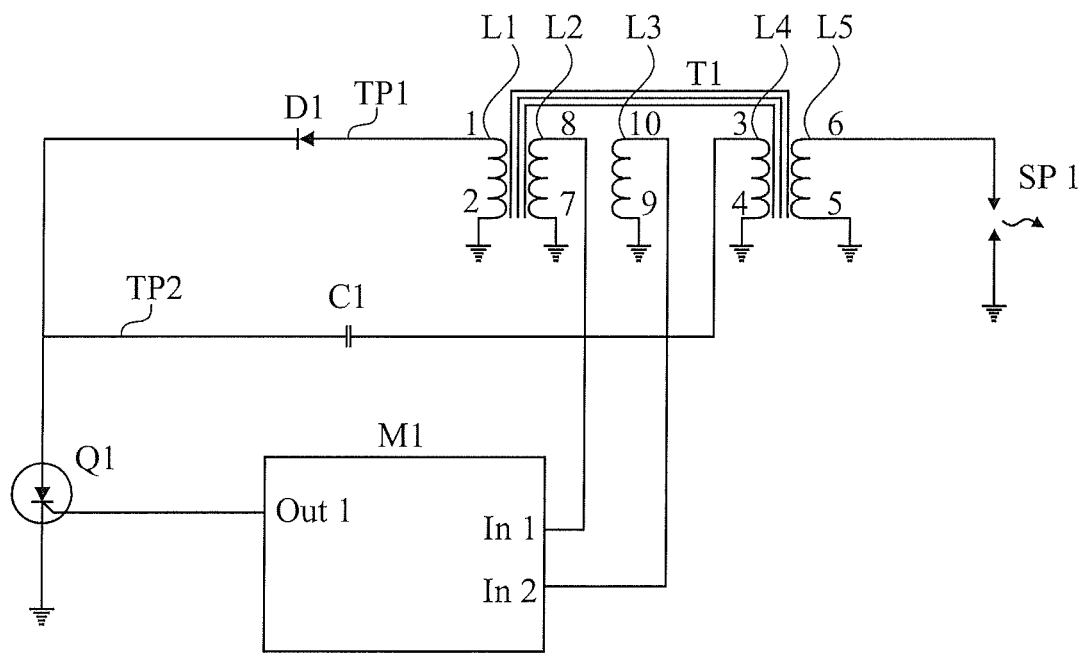
FIG. 1 shows a circuit diagram of an ignition system according to a preferred embodiment of the invention.

FIG. 1 shows a circuit diagram of a conventional ignition system, modified according to a preferred embodiment of the invention. An iron core T1 with four conventionally arranged coils, L1, L2, L4 and L5, is arranged to be magnetised by at least one magnet, rotating with a flywheel (not shown) in the vicinity of the iron core T1.

The first coil L1 is a charge coil, arranged for inducing a voltage that can be used for generating a spark, and for this purpose the charge coil L1 is connected at one end 2 to ground and at another end 1 to a charge capacitor C1 via a rectifier D1.

The coils L4 and L5 are a primary and secondary coil, respectively, and are arranged to serve as a transformer and generate an ignition voltage to a spark plug SP1. This is achieved by the primary coil L4 being connected at one end 3 to the charge capacitor C1 and being grounded at the other end 4, while the secondary coil L5 is connected to ground at one end 5 and to the spark plug at the other end 6. The control unit M1 can via a pulse out on Out1 open a thyristor Q1 and then empty the charge voltage in the charge capacitor C1 and thus create a high voltage pulse in the secondary coil L5 due to an induced magnetic field via the primary coil L4.

The fourth coil is a trig coil L2, connected to ground at one end 7 and to a control unit M1 via a connection In1 at the other end 8, and from this trig coil L2 information regarding a position and rotational velocity of the flywheel can be transmitted. This information is, however, due to its position at the iron core T1, subject to any disturbances that may arise during operation of the ignition system, especially at the time when a spark is generated, and the information from said trig coil L2 is therefore not reliable at all times.

According to the invention, a fifth coil, the separate coil L3, is provided in the vicinity of the coils L1, L2, L4, L5 but not mounted on the iron core T1. Said separate coil L3 is connected at one end 10 to the control unit M1 via the connection In2 and at the other end 9 to ground. The separate coil L3 is arranged as a separate magnetic circuit in order to avoid disturbances from the circuit comprising the coils L1, L2, L4 and L5.

Figure 2A:
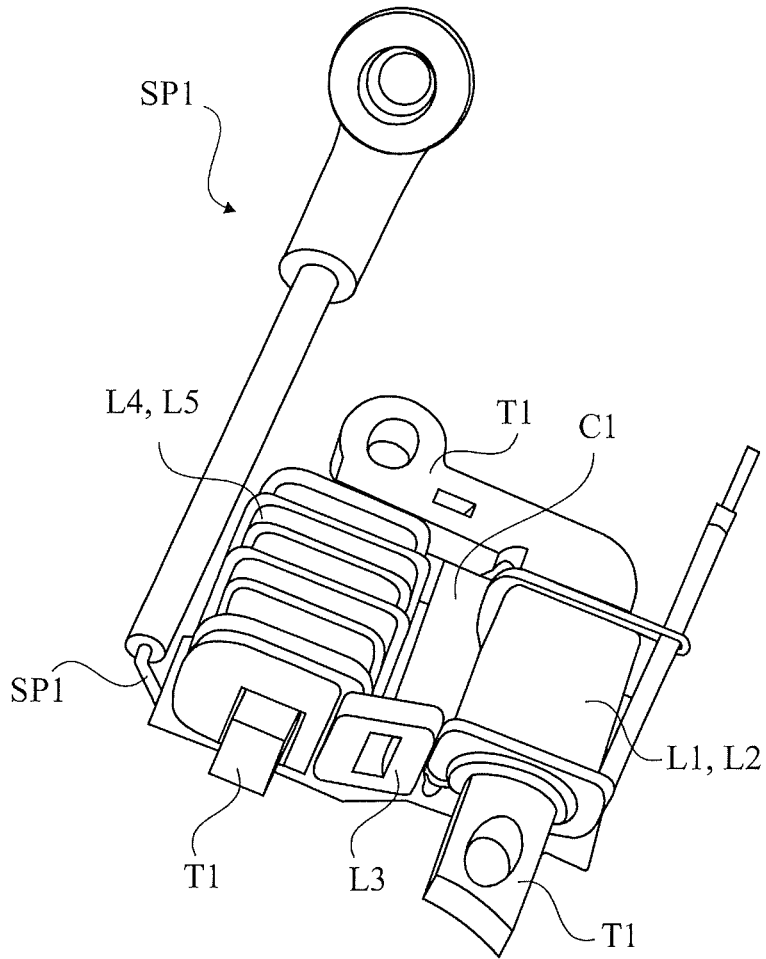
FIG. 2a shows a perspective view of a preferred embodiment of the ignition system.
Figure 2B:
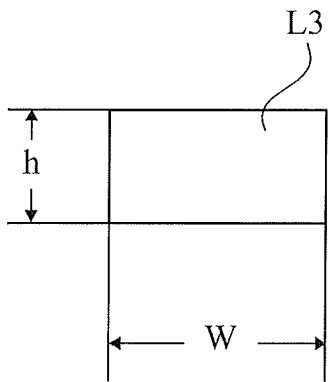
FIG. 2b shows a schematic view of a separate coil of the preferred embodiment of FIG. 2a from the side.
Figure 2C:
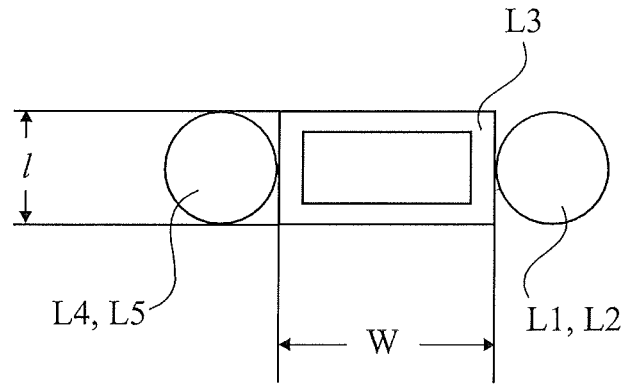
FIG. 2c shows a schematic view of the separate coil of FIG. 2b from below, with other coils shown on either side.

FIG. 2a shows a preferred embodiment of the invention, where the coils L1 and L2 can be seen mounted on the same iron core T1 as the coils L4, L5 and the capacitor C1 is placed between them. The separate coil L3 is mounted between the other coils and is arranged to be close to the flywheel, which will be arranged in such a way that the magnet or magnets pass close to this coil L3 in order for any variations in the magnetic flux generated by the flywheel to be as accurately detected by the coil L3 as possible. It is advantageous that the separate coil L3 has a width w and a length l that are substantially larger than a height h (shown in FIGS. 2b and 2c) in order for the measurements of the magnetic flux to be as accurate as possible, and also to be able to position the coil L3 to minimise the risk of flash-over which is achieved by positioning its upper side adjacent to or below the end of the neighbouring coils.

It is also advantageous if the width w and length l of the coil L3 are small enough so that the magnet or magnets of the flywheel is large enough to cover a surface presented by the coil L3 as it sweeps past.

The iron core T1 can be U-shaped with two essentially parallel extended portions so that said charge coil L1 and trig coil L2 are mounted on one of said portions and said primary and secondary coils L4, L5 are mounted on the other portion, and wherein the separate coil L3 is mounted in a space between said extended portions. Thanks to this configuration, the separate coil L3 can be placed in close vicinity to the flywheel and accurately detect any fluctuations in the magnetic flux, without depriving either of the other coils L1, L2, L4, L5 of this closeness, thereby creating optimal conditions for all coils both for the charging of the capacitor C1 and functioning of the primary and secondary coils L4, L5 for generating a spark at the spark plug SP1 and for the creations of signals at the trig coil L2 and separate coil L3 as input for the control unit M1 to control the operation of the ignition system.

During operation of the ignition system, the charge capacitor C1 is charged by the charge coil L1 from which a current through the rectifier D1 is periodically generated by the rotation of the flywheel. When an ignition voltage is to be delivered to the spark plug SP1 for the generation of a spark, the gate of the thyristor Q1 is activated by the exit OUT1 of the control unit M1 and connects the charge capacitor C1 to the ground in order for a current to flow. As a result of this, the voltage at the capacitor C1 suddenly drops, thereby creating a magnetic flux at the primary coil L4 that will be transformed into a voltage pulse in the secondary coil L5 and for a short period of time deliver the necessary voltage to the spark plug SP1 for the generation of a spark to occur.

After the initial sudden drop of voltage at the charge capacitor C1, a dampened oscillation will occur, returning the capacitor C1 to a neutral stage from which it can once again be charged by the charge coil L1 in order for the process to be started again when the next spark is needed.

The timing of the signal from the control unit M1 to generate the spark is in a conventional ignition system based on the information regarding the position and rotational velocity of the flywheel that can be gathered by measuring the magnetic flux in the trig coil L2. This is, however, subjected to considerable disturbances by the fluctuations of the magnetic field around the iron core, especially when a spark is generated and the magnetic field suddenly changes. Therefore, the analysis of data from the trig coil L2 becomes difficult when attempting to ascertain the optimal time for spark generation, especially at times when the operation takes place at low speed (slower rotation of the flywheel) or when the engine to which the ignition system delivers sparks bounces due to high compression. At these times, there is a risk for the generation of a spark at an unsuitable time, which may considerably lower the efficiency of operation of the ignition system and the engine as a whole.

In order to overcome this problem, the magnetic flux in the separate coil L3 is measured and used as input for the control unit M1 via the connection In2. Thanks to the position of the separate coil L3 at a distance from the iron core, the effect of fluctuations at spark generation will be significantly lower and a more reliable and detailed information regarding the velocity and position of the flywheel can be achieved. Based on this additional information, the timing of the spark generation can be significantly improved, and knowledge gained regarding a speed and rotational direction of the flywheel, among other things. Situations where a spark is given despite conditions being unsuitable can thus be avoided.

Figure 3A:
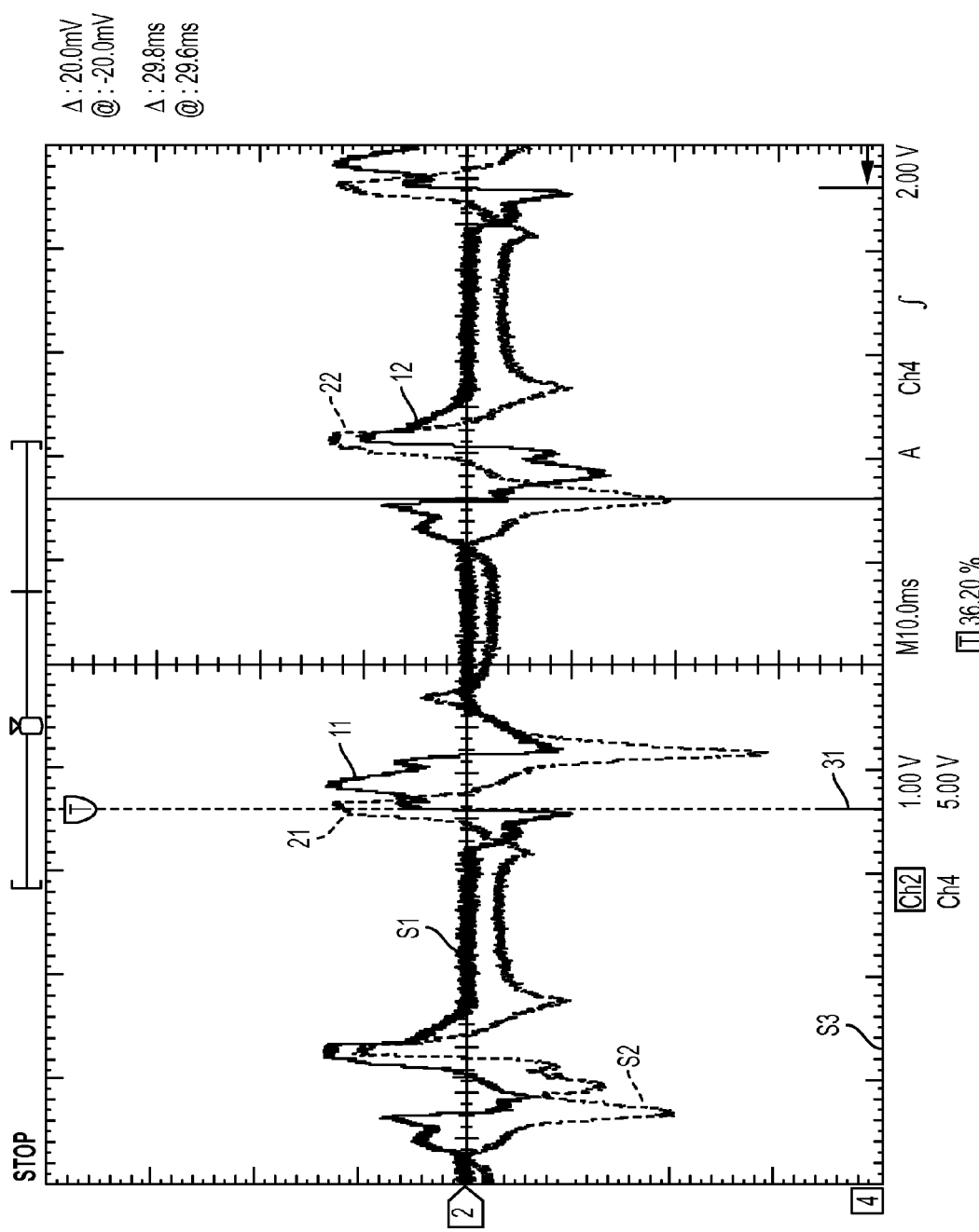
FIG. 3a shows a graph of signals describing a magnetic flux induced by a flywheel rotating at a speed of 1000 rpm in a suitable direction.

In FIG. 3a, a first signal S1 from the separate coil L3 is shown along with a second signal S2 from the trig coil L2, corresponding to the magnetic flux at these coils L2, L3 during a rotation of the flywheel of 1000 rpm in a direction suitable for spark generation at the ignition system is shown. A third signal S3 shows a peak 31 to indicate a passing of the flywheel with a leading north-ended magnet of a double pole bridge.

As the flywheel passes the coils, a first peak 11 of the first signal and a first peak 21 of the second signal is created, followed after a certain amount of time by a second peak 12 of the first signal and a second peak 22 of the second signal. By comparing the amplitude of the first and second peaks 11, 12, 21, 22 of each signal, a direction of the flywheel can be determined, and by measuring the time passing between the first and second peaks 11, 12, 21, 22, the speed of the flywheel can also be measured.

Figure 3B:
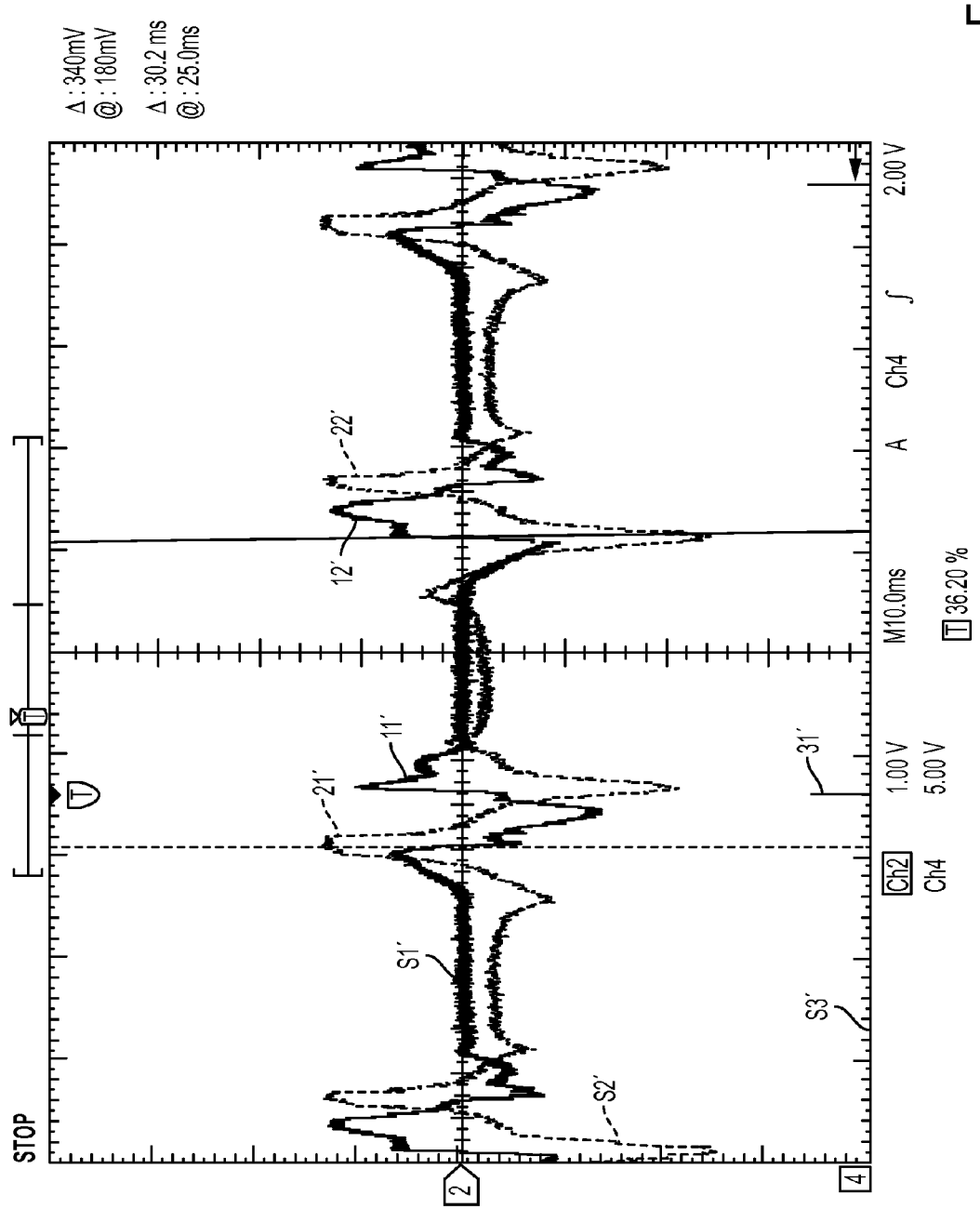
FIG. 3b shows a graph of signals describing a magnetic flux induced by a flywheel rotating at a speed of 1000 rpm in an unsuitable direction.

In FIG. 3b, the first signal S1' and second signal S2' are shown, with a third signal S3' showing a peak 31' as a flywheel with a leading south-ended magnet passes. As is shown by comparing the second signal S2 of FIG. 3a with the second signal S2' of FIG. 3b, changes to the signal from the trig coil L2 when the flywheel rotates in a suitable direction (shown by FIG. 3a) and an unsuitable direction (shown by FIG. 3b) are difficult to detect, since the amplitude of the first and second peaks 21, 22 of FIG. 3a are similar to the first and second peaks 21', 22' of FIG. 3*b*. Their placements with regard to the passing of the magnet shown by the third signal S3 are also very similar.

For the first signal S1, S1' from the separate coil L3, however, the amplitude of the first peak 11 is significantly larger than that of the second peak 12 of FIG. 3*a*. The reverse is true for the first and second peaks 11', 12' of FIG. 3*b*, with the second peak 12' being significantly larger in amplitude than the first peak 11'. This depends on a polarization of the separate coil L3 being reversed when subjected to a leading south-ended magnet of the flywheel as compared to a north-ended. Thanks to the separate magnetic circuit created by the separate coil L3 essentially independently of the magnetic circuit created by the charge coil L1, trig coil L2, primary and secondary coils L4, L5, the first signal S1 is also more reliable than the second signal S2, since magnetic fluctuations in other parts of the ignition system will have a much smaller effect on the separate coil L3.

The analyses according to the invention can be performed using only the first signal S1 from the separate coil L3. For an improved and more detailed result, information such as amplitude and placement of the peaks of both signals S1 and S2 can be used, as described herein.

A Hall effect sensor can be used as the separate coil (L3) and may be advantageous since the detection of magnetic flux, especially at low energies, can be very accurately detected. This component is, however, more expensive than conventional coils that can be very cost efficiently manufactured and used with the invention.

The information regarding the magnetic flux that the separate coil L3 can deliver to the control unit M1 could in an alternative embodiment also be given by a sensor system comprising optical sensors for detecting the position of each magnet of the flywheel. Thereby, and by performing a series of calculations at the control unit M1, the timing of a spark can be determined with an accuracy that is close to that presented by the preferred embodiment described above.

In an alternative embodiment the trig coil L2 may by its own, or together with separate coil L3, be used as the timing reference. As previously mentioned such an embodiment has its drawback regarding noise in the signal, however this may be solved by measuring many timing pulses on the L2 at the same time, and subsequently compare those times to each other and thereby draw conclusions. Thus, the trig coil L2 may be used in order to further secure the function of the separate coil L3, wherein the magnetic flux detected by said trig coil L2 can provide additional information to the control unit M1. This would create a stable system where the creation of sparks in the ignition system can be controlled in an efficient way.

The invention is not to be seen as limited by the preferred embodiment described above, but can be varied within the scope of the appended claims, as will be readily understood by the person skilled in the art. For instance, flywheels with one or two magnets can be used with the invention, and the separate coil can be a choke or a hall effect sensor, for instance.

The invention claimed is:

1. A method for monitoring an ignition system, wherein the ignition system comprises a charge coil for charging the ignition system, a primary coil and a secondary coil, said primary coil and secondary coil being arranged to generate a voltage for spark generation, a flywheel having two or more magnets, and a control unit, the method comprising the steps:

a) providing a separate coil adjacent to at least one of the charge coil, the primary coil and the secondary coil, the separate coil having a separate coil magnetic circuit, the separate coil magnetic circuit being separate from a magnetic circuit or circuits of the charge coil, primary coil, a secondary coil;

a2) rotating the flywheel to generate the voltage on the charge coil and primary coil, and generate a magnetic flux at the separate coil;

b) using the control unit to monitor the magnetic flux at the separate coil; and c) using information regarding said magnetic flux as input for controlling at least one property of an operation of the ignition system, wherein the property comprises determining a direction the flywheel is rotating.

2. The method according to claim 1, wherein the ignition system further comprises a trig coil and the method further comprises the step d) using information regarding a magnetic flux at the trig coil together with the information of step c) as input for controlling the at least one property of an operation of the ignition system.

3. The method according to claim 1, wherein said property comprises a timing of the generation of a spark in the ignition system.

4. The method according to claim 1, wherein said property comprises an operation at a safe mode where properties regarding said flywheel are used as input for said safe mode.

5. The method according to claim 4, wherein said property comprises a speed of said flywheel.

6. The method according to claim 1, wherein said separate coil is a Hall effect sensor.

7. A control system for an ignition system, said ignition system comprising:

a charge coil;

a separate coil that is arranged to be exposed to a magnetic field in a vicinity of the charge coil, the separate coil having a separate coil magnetic circuit, the separate coil magnetic circuit being separate from a magnetic circuit of the charge coil;

a flywheel having two or more magnets, wherein when the flywheel is rotated a voltage is generated by the charge coil and a magnetic flux is generated in the separate coil; and a control unit that is arranged to gather information regarding the magnetic flux in said separate coil, and the control unit is configured to use the information as input for controlling at least one property of an operation of the ignition system, said at least one property comprising determining a direction of rotation of the flywheel.

8. The control system according to claim 7, said ignition system further comprising a trig coil, wherein the control unit is arranged to gather information regarding a magnetic flux in said trig coil.

9. The control system according to claim 7, wherein said control unit is arranged to allow the ignition system to generate a spark at a time that is determined based on the information gathered from the separate coil and the trig coil.

10. The control system according to claim 7, wherein said charge coil and trig coil are mounted on an iron core and wherein said system further comprises a primary coil and a secondary coil mounted on the same iron core, and wherein the separate coil is mounted adjacent to said iron core.

11. The control system according to claim 10, wherein said iron core is U-shaped with two essentially parallel extended portions so that said charge coil and trig coil are mounted on one of said portions and said primary and secondary coils are mounted on the other portion, and wherein the separate coil is mounted in a space between said extended portions.

12. The control system according to any of claim 7, wherein the control unit is arranged to secure the operation of the ignition system in order for a spark generation to take place only at a time where the control unit considers the state of the system to be beneficial for such generation.

13. The control system according to any of the claim 7, wherein the separate coil is a Hall effect sensor.

14. The control system according to claim 7, wherein said information of said flywheel comprises information regarding the speed of rotation of said flywheel.

\* \* \* \* \*